(12) United States Patent
Kilinc et al.

(10) Patent No.: US 11,922,942 B1
(45) Date of Patent: Mar. 5, 2024

(54) NATURAL LANGUAGE PROCESSING

(71) Applicant: Amazon Technologies, Inc., Seattle, WA (US)

(72) Inventors: Emre Can Kilinc, Santa Barbara, CA (US); Thomas Reno, Santa Barbara, CA (US); John Zucchi, Santa Barbara, CA (US); Joshua Kaplan, Santa Barbara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 830 days.

(21) Appl. No.: 16/892,653

(22) Filed: Jun. 4, 2020

(51) Int. Cl.
*G10L 15/26* (2006.01)
*G10L 15/18* (2013.01)

(52) U.S. Cl.
CPC .............. *G10L 15/26* (2013.01); *G10L 15/18* (2013.01)

(58) Field of Classification Search
None
See application file for complete search history.

(56) References Cited

U.S. PATENT DOCUMENTS

| | | | | |
|---|---|---|---|---|
| 6,144,938 A * | 11/2000 | Surace | ............... | H04M 3/4936 704/E13.004 |
| 6,757,362 B1 * | 6/2004 | Cooper | ............... | H04M 3/527 379/88.16 |
| 11,269,872 B1 * | 3/2022 | Moo | ............... | G06F 16/243 |
| 11,475,053 B1 * | 10/2022 | Das | ............... | G06F 16/3344 |
| 2005/0033582 A1 * | 2/2005 | Gadd | ............... | G10L 15/26 704/E15.04 |
| 2013/0159021 A1 * | 6/2013 | Felsher | ............... | G16H 10/60 705/3 |
| 2013/0304758 A1 * | 11/2013 | Gruber | ............... | G06F 16/248 707/769 |
| 2013/0316773 A1 * | 11/2013 | Boyd | ............... | G09B 5/02 463/9 |
| 2014/0035720 A1 * | 2/2014 | Chapman | ............... | B42D 25/00 235/488 |

(Continued)

OTHER PUBLICATIONS

Grossman; "Announcing Alexa Knowledge Skills (Preview): Query Your Organization's Data Without Writing Code or Invoking a Skill Name"; Dec. 16, 2019; Retrieved from https://developer.amazon.com/en-US/blogs/alexa/alexa-skills-kit/2019/12/Announcing-Alexa-Knowledge-Skills-Preview-Query-Your-Organizations-Data-Without-Writing-Code-or-Invoking-a-Skill-Name on Apr. 6, 2020; 3 pgs.

(Continued)

*Primary Examiner* — Neeraj Sharma
(74) *Attorney, Agent, or Firm* — K&L Gates LLP

(57) ABSTRACT

Devices and techniques are generally described for generating response templates for natural language processing. In various examples, a first knowledge graph comprising a plurality of entities may be received. First text data may be received for a first response template, the first text data defining a natural language input configured to invoke the first response template. A response definition may be received for the first response template, the response definition defining a response associated with the first response template. Natural language input data may be received. A determination may be made that the natural language input data corresponds to the natural language input configured to invoke the first response template. The first response template may be configured to generate natural language output data.

20 Claims, 9 Drawing Sheets

(56) References Cited

U.S. PATENT DOCUMENTS

| | | | | |
|---|---|---|---|---|
| 2015/0032443 A1* | 1/2015 | Karov | ................... | G06F 40/35 |
| | | | | 704/9 |
| 2018/0232262 A1* | 8/2018 | Chowdhury | ............ | G06F 9/541 |
| 2018/0307687 A1* | 10/2018 | Natkin | ................ | G06F 16/3329 |
| 2020/0349120 A1* | 11/2020 | Crane | ................. | G06Q 10/101 |

OTHER PUBLICATIONS

Author Unknown; "Understand Knowledge Skills"; Retrieved from https://developer.amazon.com/en-US/docs/alexa/knowledge/understand-knowledge-skills.html on Apr. 6, 2020; 2 pgs.

* cited by examiner

NATURAL LANGUAGE PROCESSING

BACKGROUND

Automatic speech recognition (ASR) combined with language processing techniques may enable a computing device to retrieve and process commands from a user based on the user's spoken commands. Natural language processing can be used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
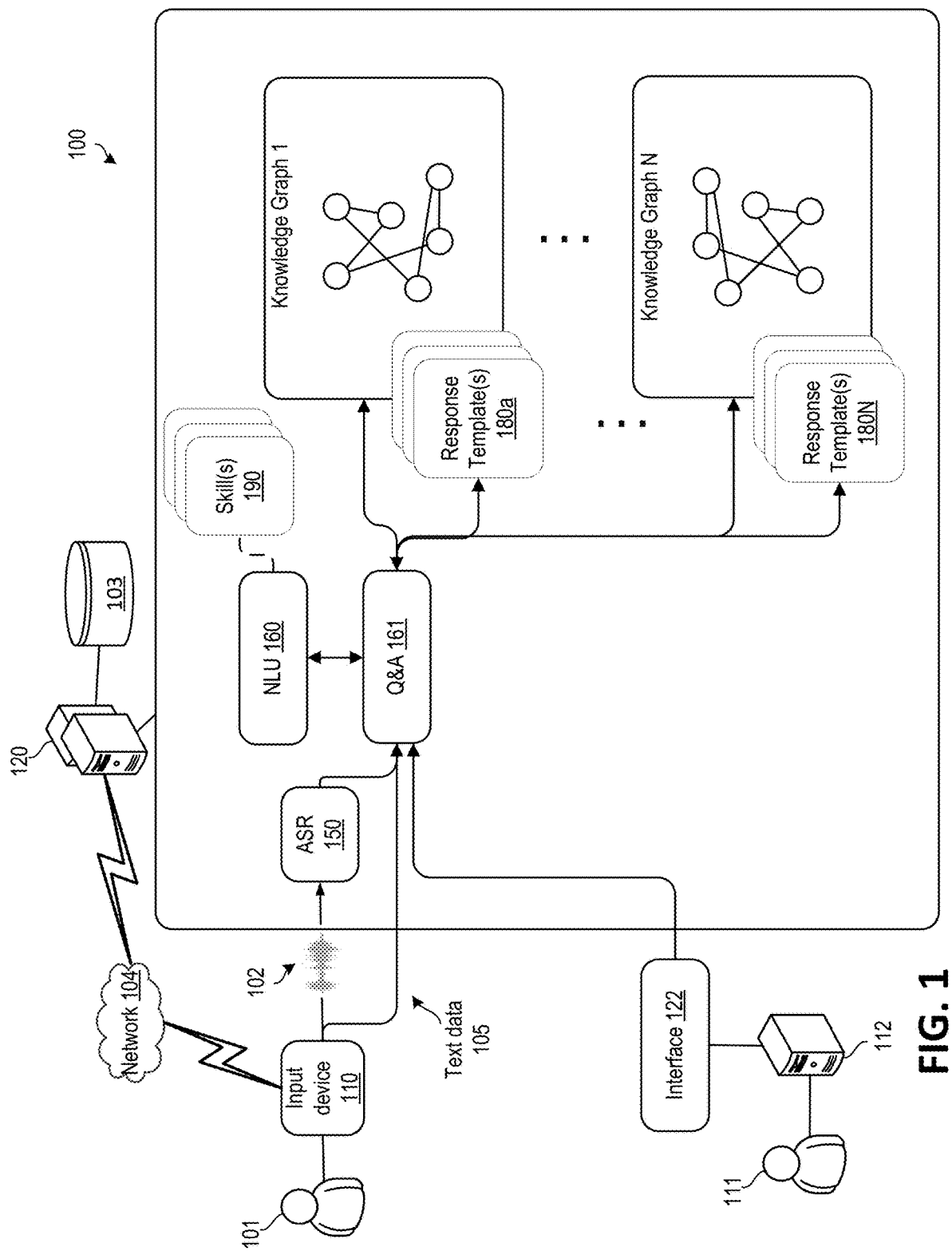
FIG. 1 is a diagram of a system configured to generate natural language responses to questions using response templates, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific semantic intent data representing a semantic interpretation of the text. The semantic intent data may include executable commands or other type of instructions. As described in further detail below, in some examples, NLU processing may employ a federated approach in which multiple different process flows may be executed for a given natural language input in order to determine a semantic intent of the natural language input. Thereafter one or more of the semantic intents may be selected for further processing and/or output by the NLU system. For example, the semantic intent associated with the highest confidence score among the different semantic intents generated may be selected for further processing and/or output.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data and/or other skill output that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software.

In various examples, speech processing systems may determine an action to take for processing particular request data according to an interpretation of the natural language input (represented by the request data), as determined by NLU. In various examples, multiple NLU process flows may be executed for a given natural language input as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entities and/or other semantic language data of a natural language input may be parsed and sent to the knowledge graph which, in turn, may be configured to relate different entities and/or attributes of those entities (data describing characteristics of the entities) to one another.

In various examples, it may be advantageous to perform NLU processing using multiple different NLU strategies (e.g., a federated NLU approach) in order to generate optimal output. For example, some NLU strategies may be unsuccessful in determining a semantic interpretation of a given natural language input, while another NLU strategy may be able to generate appropriate output. In some other examples, it may be advantageous to perform NLU processing using multiple NLU strategies as one or more of the secondary NLU strategies may determine a semantic interpretation that is more appropriate for a given utterance relative to the primary NLU strategy. In various examples, NLU strategies may use machine learning models such as recurrent neural networks and/or other machine learning algorithms in order to determine a semantic intent of the input natural language data. In various examples, In various examples, knowledge graphs of a natural language processing system may be specific to a particular entity, such as a particular organization. For example, a particular organization may upload data representing at least some of the organization's data (e.g., in one or more data structures such as tables or arrays). The organization's data may be configured to generate a knowledge graph specific to the organization. The knowledge graph may be configured to understand and answer natural language-based questions. For example, an employee of the organization may pose a question to a voice assistant, such as "Who is working on Project Alpha?" or "What office does Rick Smith sit in?" The knowledge graph and/or the response templates described herein may be configured to generate semantic understandings of such questions and may be configured to generate natural language responses to such questions based on the organization's data.

In an example, one NLU strategy that may be employed by a question and answer component of an NLU system may be described as a "bottom-up" NLU strategy. In the example, a bottom-up NLU strategy may use different combinations of ontological relationships (e.g., determined using a knowledge graph), entity recognition, and/or entity disambiguation to identify components of a natural language input such as an input utterance or text. A bottom-up NLU strategy may generate multiple different semantic interpretations of the natural language input, and may generate a ranked list of the different semantic interpretations (e.g., using beam search techniques and/or based on different confidence scores).

In various examples, as part of a bottom-up NLU strategy, in order to respond to a user's query, the system may use a knowledge graph to obtain or confirm information requested by the query. A knowledge graph is a data store that includes facts organized in a particular manner that may be configured to respond to user queries. A knowledge graph may include a collection of tuples and may encode formal semantics on the data stored within the knowledge base. The knowledge graph may also include a schema (e.g., defined by classes and properties) to organize its data. In order to retrieve answer data from a knowledge graph, a query may first be parsed and new data generated in a form recognizable by the knowledge base.

There are many types of queries that a user may pose from simple single-fact questions (for example, "what is the capital of France?") to more detailed questions involving time, place, multiple entities, etc. (for example, "when was Tom Cruise married to Nicole Kidman?"). In some examples, bottom-up NLU strategies may use a rule-based approach. In such an approach, a series of rules may be configured to analyze the incoming query text to identify the intent of the query (e.g., what information is being sought) and what entities are named in the query that are needed to provide the desired information. In a rule-based approach, rules may be applied to query text, where the results of each rule's processing may be given a confidence score where the rule results corresponding to a highest confidence score are selected, parsed, and passed on to the knowledge graph.

Result data may be generated in a structured data representation using the knowledge graph. For example, for the query, "how old is Barack Obama?" a knowledge graph may be configured to generate structured result data comprising the triple [barack_obama] [has_age] [age: [integer: ["58"]]]. A triple is an example of structured data including a meaning representation of the result. Generally, structured data may specify one or more entities and/or relationships between those entities. In a triple, a first entity, referred to as a "subject," is linked to a second entity, referred to as an "object," by a "predicate." In the foregoing example, Barack Obama is the subject, has_age is the predicate, and 58 is the object. In another example, a query may be "what is the capital of France?" A question and answer system (using various NLU techniques) may select one or more triples from a knowledge graph as an appropriate response to the query. For example, the triple [Paris] [is_capital_of] [France] may be selected. The result data may be passed to one or more speech processing skills and/or other software that may be configured to generate a natural language response from the result data so that the response data is interpretable by a human. Thereafter, the natural language response may be output by a device local to the user as speech (e.g., via a TTS component) and/or as text.

In some examples, bottom-up NLU strategies may perform well for particular types of questions. For example, bottom-up NLU strategies may perform well for single data point questions, such as "what is the population of California," multiple data point questions, such as "what is the area and population of California," temporal attributes, such as "what was the population of the United States ten years ago," list type questions, such as "Jackie Gleason movies," comparison questions such as "battery life of phone X vs. phone Y," superlative questions such as "who was the second tallest Republican president," count questions such as "how many US presidents are over six feet tall," statistics questions such as "what is the median height of US citizens," geo-location questions, such as "what are some local bars near me," simple reasoning questions, such as "Was Obama a democratic senator," etc.

In another example, in addition to the bottom-up NLU strategy a question and answer component of an NLU system may employ a "top-down" NLU strategy. In a top-down NLU strategy, response templates (sometimes referred to as "search templates" and/or "user-defined intents") may be used. The top-down approach may be successful at generating an accurate semantic interpretation of the input natural language data in examples where the question is abstract and/or where one or more entities, collections (e.g., ontologies and/or knowledge graphs), and/or attributes are not referenced in the natural language input itself. Accordingly, language cues in the natural language input are configured to match the natural language input to a pre-defined response template. The response template, in turn, defines a response type and may be configured to generate the appropriate response to the question.

An example of a natural language input that may invoke a response template (assuming the response template is so-defined) may be "how much [chemical] should I have in my diet?" In this example, the abstract natural language input may be mapped to a knowledge construct in the knowledge graph. For example, the natural language input may be mapped to (entity=[chemical], attribute= recommended daily intake) to produce the semantic interpretation of the natural language input question. The knowledge construct may be defined by the response template, as described in further detail below.

In various examples, since different organizations have their own private and/or confidential knowledge bases and/or knowledge graphs, response templates may be customized for individual organizations. In the examples herein, a "tenant" refers to a group of users (such as employees of an organization and/or employees with a particular security clearance) who share a common access privilege to a private, sandboxed knowledge graph associated with a tenant identifier. As described herein, interfaces are provided so that each tenant may generate their own custom response templates to be configured to generate semantic interpretations and responses to questions pertaining to the tenant's knowledge base. In various examples, such customized response templates may act as patches to the knowledge graph insofar as such response templates may be configured to generate accurate semantic interpretations and responses to questions that may otherwise not be accurately answered using a bottom-up approach.

Figure 9:
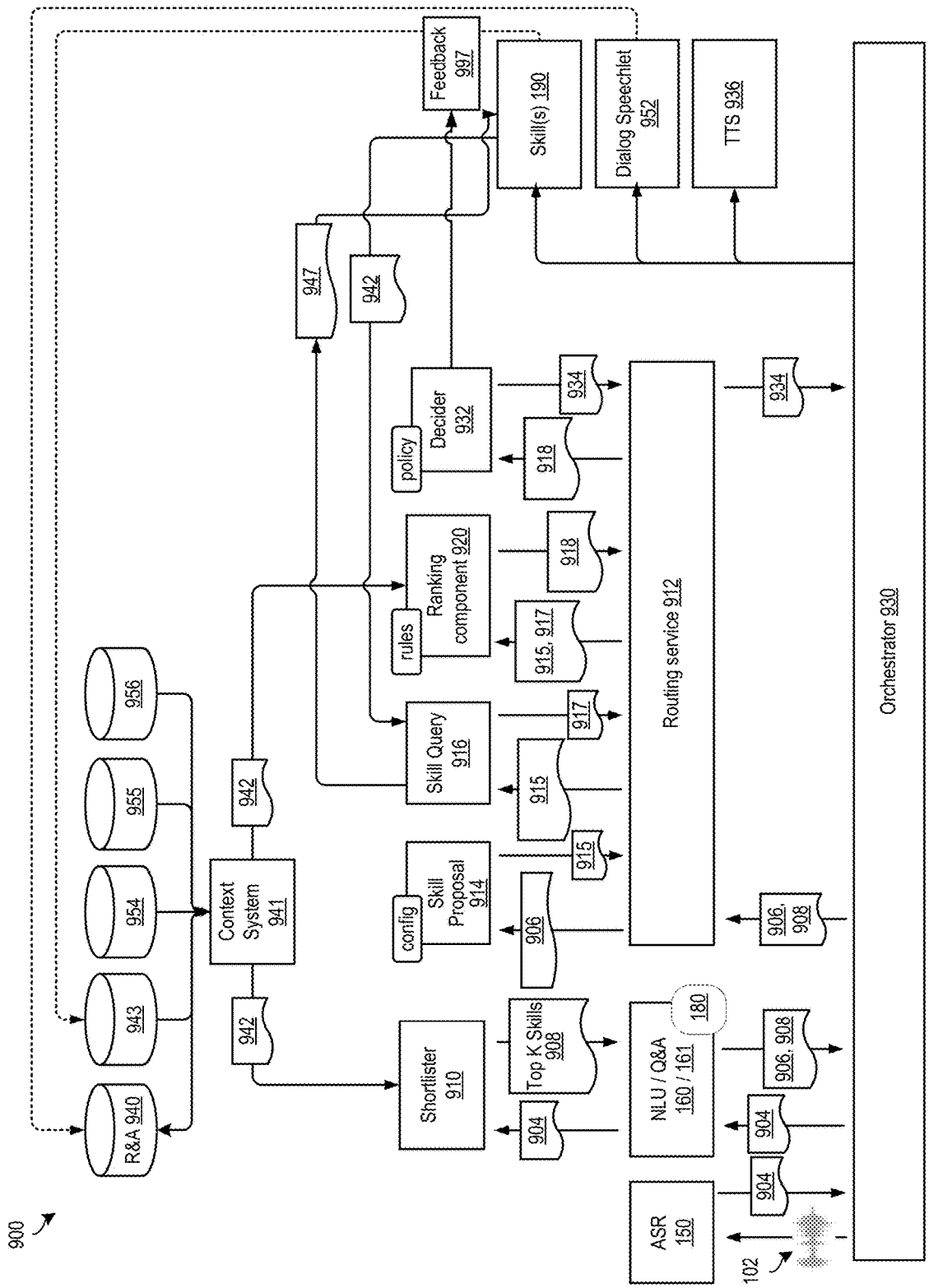
FIG. 9 is a block diagram illustrating an example speech processing system, according to various embodiments of the present disclosure.

FIG. 1 is a diagram of a system 100 configured to generate natural language responses to questions using response templates, according to various embodiments of the present disclosure. In various examples, a user 101 may communicate with a local device 110. Local device 110 may be a speech-processing enabled device and may be effective to continually "listen" for a wake word. Upon detection of a wake word, input device 110 may record and send audio over network 104 to a natural language processing system 120. Natural language processing system 120 may include one or more computing devices effective to perform various techniques to generate a semantic interpretation of natural language input data and generate responses thereto. Natural language processing system 120 may include fewer or additional components apart from those specifically shown and described in FIG. 1. For example, FIG. 9 depicts an example of a more detailed natural language processing system that may be used in accordance with various aspects of the present disclosure.

In an example, audio data 102 representing a user query may be sent over network 104 to natural language processing system 120. Network 104 may be a wide area network (WAN), such as the Internet, or may be a local area network (LAN). In various other examples, input device 110 may be configured to receive text data and/or may perform speech recognition locally. In such examples, input device 110 may send text data 105 representing natural language input data over network 104 to natural language processing system 120.

In various examples, the audio data 102 may be sent by the natural language processing system 120 to ASR component 150. ASR component 150 may generate text data representing the audio data. In some examples, the text data representing the audio data 102 may be sent to NLU component 160. In examples where user 101 provides text input and/or where the input device 110 generates and sends text representing a user utterance, text data 105 may be sent to NLU component 160. In various other examples, the text data 105 may be sent to question and answer component 161. In various examples, NLU component 160 may confirm that the text data 105 (and/or text output by ASR component 150) represents a question for answering by question and answer component 161.

NLU component 160 may employ a number of different natural language understanding strategies, in a federated approach, in order to understand natural language input data. For example, NLU component 160 may include and/or may be configured in communication with a question and answer component 161. Question and answer component 161 may send the text data and/or a meaning representation representing the text data (e.g., a triple, etc.) to a knowledge graph in order to generate a semantic interpretation of the natural language input data and determine an appropriate response. In various examples, there may be multiple knowledge graphs stored in non-transitory computer-readable memory 103. Non-transitory computer-readable memory 103 may be a distributed memory. Accordingly, different knowledge graphs may be partitioned among different instances and/or different databases in non-transitory computer-readable memory 103. Additionally, in various examples, non-transitory computer-readable memory 103 may store instructions effective to program at least one processor (e.g., processors and/or processor cores associated with computing devices of natural language processing system 120) to perform the various techniques described in the current disclosure.

In various examples, after determining intent data and/or the answer to a question using a knowledge graph, the intent data and/or answer data may be sent to a particular speech processing skill 190 that may be configured to take one or more actions based on the intent data and/or answer data. For example, a skill 190 may be effective to generate natural language text representing the answer to the user's input question. The natural language text may be transformed into corresponding audio using a TTS component, as described in further detail below.

In some examples, input device 110 may be associated with metadata such as a particular device identifier (ID). The device ID may in turn be associated with a particular user account identifier (ID). For example, input device 110 may be associated with the user account ID of user 101. User 101 may be an employee of organization A. Accordingly, user 101's user account ID may be associated with organization A. The natural language processing system 120 may determine that the device ID of input device 110 is associated with the user account ID of user 101 which is, in turn, associated with organization A. In other words, natural language processing system 120 may determine that user 101 and/or input device 110 has access privileges to the knowledge graph associated with organization A. As such, question and answer component 161 of natural language processing system 120 may send the input natural language data (e.g., the parsed user query) to the knowledge graph associated with organization A and may employ a bottom-up NLU strategy to attempt to generate response data. In the current example, knowledge graph 1 may be associated with organization A.

In another example, metadata may be received from input device 110 together with audio data 102 and/or text data 105 that identifies a device ID of input device 110, a user account associated with input device 110, location data describing input device 110, user ID data describing an identity of user 101, etc. Such metadata may be used to determine a particular knowledge graph associated with the user account, user, device, location, etc., described by the metadata. As described herein, there may be a particular set of response templates 180 that are associated with the particular knowledge graph. Accordingly, the metadata may be used to determine the appropriate knowledge graph and/or the appropriate response templates associated therewith.

As previously described, in some examples the bottom-up approach may be ineffective to determine a response to the natural language input data representing the user query. Accordingly, question and answer component 161 may determine whether or not the natural language input data (and/or a structured representation thereof) invokes one or more response template(s) 180*a*. The response templates 180*a* may be specific to organization A and thus to knowledge graph 1. In some examples, a finite state transducer (FST) may be configured to determine whether or not the natural language input data representing the user query invokes any response template(s) 180*a*. Invocation of a response template is described in further detail below in reference to FIG. 2.

In another example, an account ID of a user may be determined by means other than determining the device ID from which a user query was sent (and/or determining an account ID associated with the device ID). For example, a user my log into an account using log-in credentials and/or using some personally identifiable information provided by the user (e.g., fingerprint scan, face recognition, etc.). It should be appreciated that the user may have full control over such data and/or authentication means and may opt to turn off such security features in the interest of privacy, even where such opting-out results in reduced functionality.

In an example, a second user (not shown) may be associated with an organization B (e.g., the user's account ID may be associated with organization B). Accordingly, the user's question may be processed using a knowledge graph (e.g., knowledge graph N) that is specific to organization B and/or using response template(s) (e.g., response template(s) 180N) that are specific to organization B.

In various examples, an interface 122 may be provided that enables a user 111 to generate customized response templates for a knowledge graph associated with the user 111. User 111 may access interface 122 through a computing device 112. Although not shown in FIG. 1, computing device 112 may communicate with natural language processing system 120 and/or non-transitory computer-readable memory 103 over network 104. For example, user 111 may be a systems administrator for an organization that has deployed a private and/or confidential knowledge graph on natural language processing system 120. User 111 may determine (e.g., using a performance dashboard, such as the example performance dashboard depicted in FIG. 4) that a particular user utterance is not being understood and/or answered correctly using the knowledge graph associated with the organization. For example, statistics depicted on the performance dashboard may indicate that the organization's knowledge base is unable to understand a particular query and/or class of queries using a bottom-up NLU strategy.

Interface 122 may allow the user 111 to generate a custom response template for the particular query and/or class of queries. In some examples, interface 122 may automatically generate a response template for a query that is not being understood (e.g., using a machine learning approach to generate an appropriate response to the query). In other examples, interface 122 may allow the user 111 to generate a response template manually, as further described in reference to FIG. 2. For example, interface 122 may allow user 111 to name a response template, define natural language input data (e.g., text) and/or a class of user utterance that causes the custom response template to be invoked, define a response type for the response template, and define a response for responding to the input natural language data. In another example, the interface 122 may allow the user 111 to enable the response template and/or disable the response template for use by the question and answer component 161 in performing a top-down NLU strategy using the custom response template.

Figure 2:
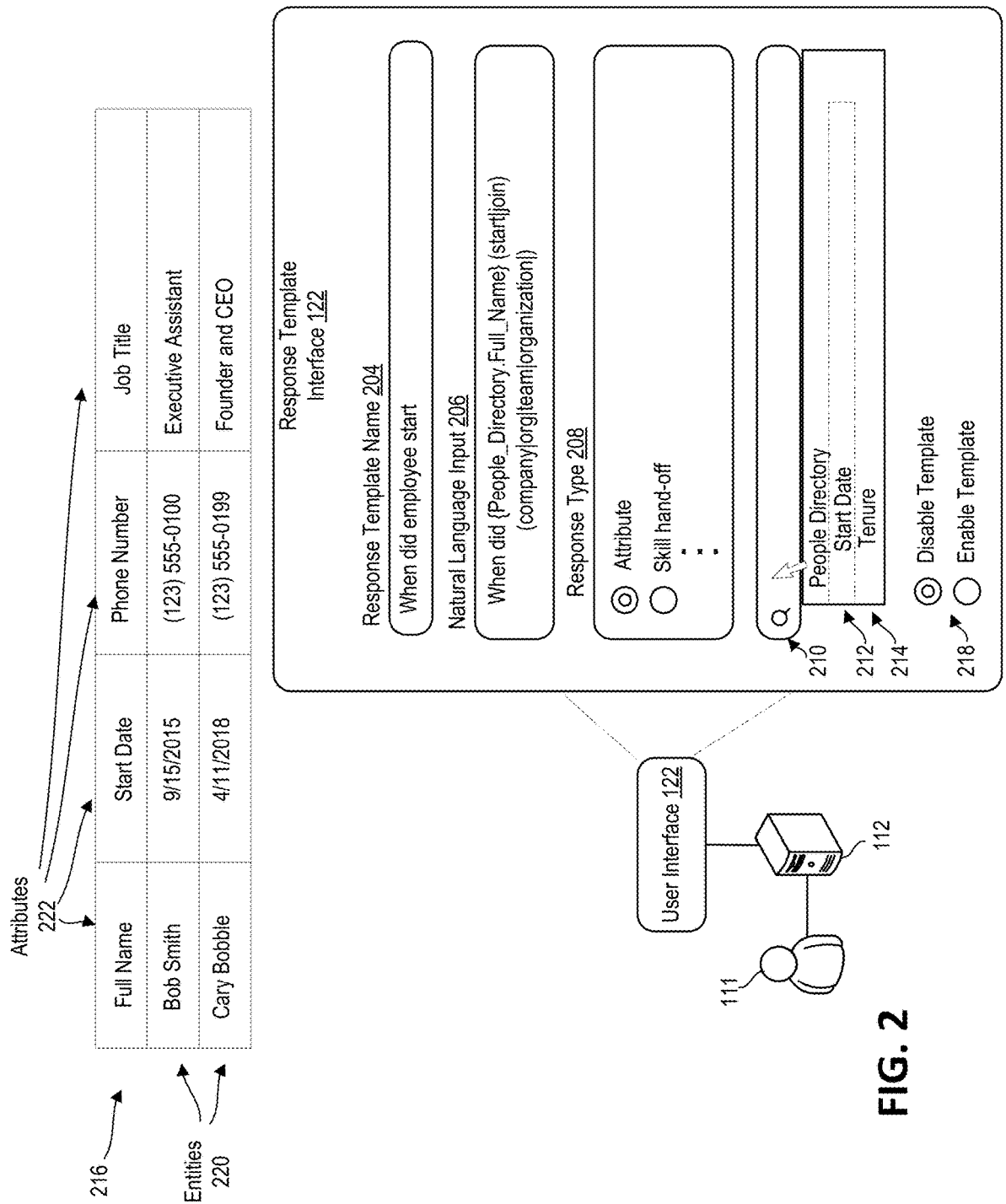
FIG. 2 depicts an interface that may be used to generate natural language response templates, in accordance with various embodiments of the present disclosure.

FIG. 2 depicts an example interface 122 (e.g., a GUI) that may be configured to generate natural language response templates, in accordance with various embodiments of the present disclosure.

Interface 122 may be a response template interface that may be used by user 111 to generate a custom response template (e.g., one of response templates 180*a*-180N). In an example, the custom response template may be configured to patch semantic interpretation deficiencies of using a particular knowledge graph in a bottom-up NLU strategy. In some cases, the knowledge graph may be associated with a tenant of natural language processing system 120.

The interface 122 may comprise a response template name field 204. The response template name field 204 may allow user 111 to name the response template for reference, access, and/or editing. In the example depicted in FIG. 2, the user 111 has named the response template "When did employee start," as the response template may be configured to determine the start date of employment of an employee of the organization associated with the knowledge graph with which the response template is to be associated.

Interface 122 may further comprise a natural language input field 206. The natural language input field 206 may allow the user 111 to generate natural language input data (e.g., data representing an utterance and/or class of utterances, string data (such as text), etc.) that invokes the response template during runtime (e.g., during a question and answer session processed using question and answer component 161 of natural language processing system 120). In various examples, the natural language input data specified in natural language input field 206 may include one or more slots. Slots may be placeholders for slot data comprising text referencing a particular entity and/or attribute that is predefined according to a knowledge graph and/or other data available to the natural language processing system 120.

In the example depicted in FIG. 2, the natural language input data configured to invoke the response template is "When did {People_Directory.Full_Name} (start|join) (company|org|team|organization)." In this example, {People_Directory.Full_Name} represents slot data related to entities of the people directory 216. However, in other examples, the slot data may refer to entities and/or attributes in a knowledge graph associated with the organization for which the response template is being generated. In particular, {People_Directory.Full_Name} denotes that if the input natural language data (e.g., the query) is determined to conform to the data specified in natural language input field 206 (e.g., a user query asking "When did Bob Smith join the team?"), that a field "Full_Name" of a data structure "People_Directory" should be searched for the specified attribute (e.g., "Bob Smith"). The terms in parentheses (e.g., "(startj oin)") denote alternative expressions that may be configured to invoke the response template. In the "(start|join)" example, either the word "start" or the word "join" may invoke the response template provided the entire utterance (e.g., the entire natural language input data representing the user question) conforms to the natural language input data specified in natural language input field 206. In various examples, common words (such as articles "the", "a", and/or other commonplace words) may be ignored when determining whether the natural language input data representing the user question conforms to the natural language input data specified in natural language input field 206. In some examples, multiple statements and/or categories of statements may be included in natural language input field 206, as desired, in order to use different utterances, text strings, and/or phrases to invoke the response template. In some further examples, natural language input data may be suggested by a machine learning system based on previous performance statistics. For example, an auto-complete feature may be configured to suggest the user queries that the knowledge graph is most likely to misinterpret (e.g., based on user feedback and/or timeout data).

Interface 122 may further comprise a response type field 208. Response type field 208 may include a number of different selectable response types. In the example depicted in FIG. 2, response type field 208 comprises a button for the "attribute" response type and a button for the "skill hand-off" response type. In an example, an attribute response type may indicate that an attribute from a knowledge graph and/or other data structure accessible by the question and answer component 161 is to be used as a response to the natural language input data configured to invoke the response template (as defined by the data input into natural language input field 206). In another example, the skill hand-off response type may indicate that the input natural language data should be sent to one or more speech processing skills for processing. For example, a particular speech processing skill may be designed to process and/or respond to a particular user query. Accordingly, the response template may "forward" the input natural language data to the appropriate skill.

In the example depicted in FIG. 2, the user 111 has selected the "attribute" response type in response type field 208. Accordingly, a field 210 allows the user 111 to search for and/or otherwise input an attribute that the user would like to be part of the response data for the natural language input data in natural language input field 206. In the example in FIG. 2, a drop down box displays two different attributes 212, 214 from the People Directory 216. In the example, attributes from the People Directory 216 may be suggested based on the slot data included in the text in the natural language input field 206 specifying People Directory. As depicted, the People Directory 216 comprises a number of different attributes 222 (e.g., Full Name, Start Date, Phone Number, and Job Title) and a number of different entities 220 (e.g., rows of the table corresponding to employees Bob Smith and Cary Bobble). The dashed box around attribute 212 "Start Date" in the example interface 122 may indicate that the attribute 212 "Start Date" is being suggested as the text in natural language input field 206 indicates "(start|join)." However, user 111 may select a different attribute for the response template, as desired. Field 218 includes an enable template button and a disable template button. Enabling the template allows the question and answer component 161 to use the template to respond to natural language input data that invokes the response template (as defined by natural language input field 206).

In an example, after enabling the response template depicted in FIG. 2, a user with access privileges to the particular response template and knowledge graph (e.g., a user that is part of the tenant corresponding to the response template and the knowledge graph for an organization associated with People Directory 216) may ask the question "When did Cary Bobble start at the company?" In the example, in parallel with execution of a bottom-up NLU strategy (and/or one or more other NLU strategies), the response template depicted in FIG. 2 may be invoked as the text representing the user's question (e.g., generated by ASR component 150) matches the natural language input data defined in natural language input field 206. Note that the term "at" in the user's question may be ignored in this example for purposes of determining whether the user's question matches the natural language input data defined in natural language input field 206. Accordingly, the slot data {People_Directory.Full_Name} may cause the question and answer component 161 to query the Full Name attribute 222 of the People Directory 216 using "Cary Bobble." Upon finding the entity 220 "Cary Bobble" in the People Directory 216, the question and answer component 161 may search the People Directory 216 for the Start Date attribute 222 associated with Cary Bobble, as the Start Date attribute is specified by the response template in association with the user's input question. Accordingly, the question and answer component 161 may response with response data including the Start Date attribute data for Cary Bobble. The response data may comprise a natural language response that includes the relevant attribute data. In the example, the question and answer component 161 may generate output text "Cary Bobble joined the company on Apr. 11, 2018." In the example, the text may be transformed into audio data via a TTS component and may be output to the user. In another example, the output text may be output on a display associated with the user.

Figure 3:
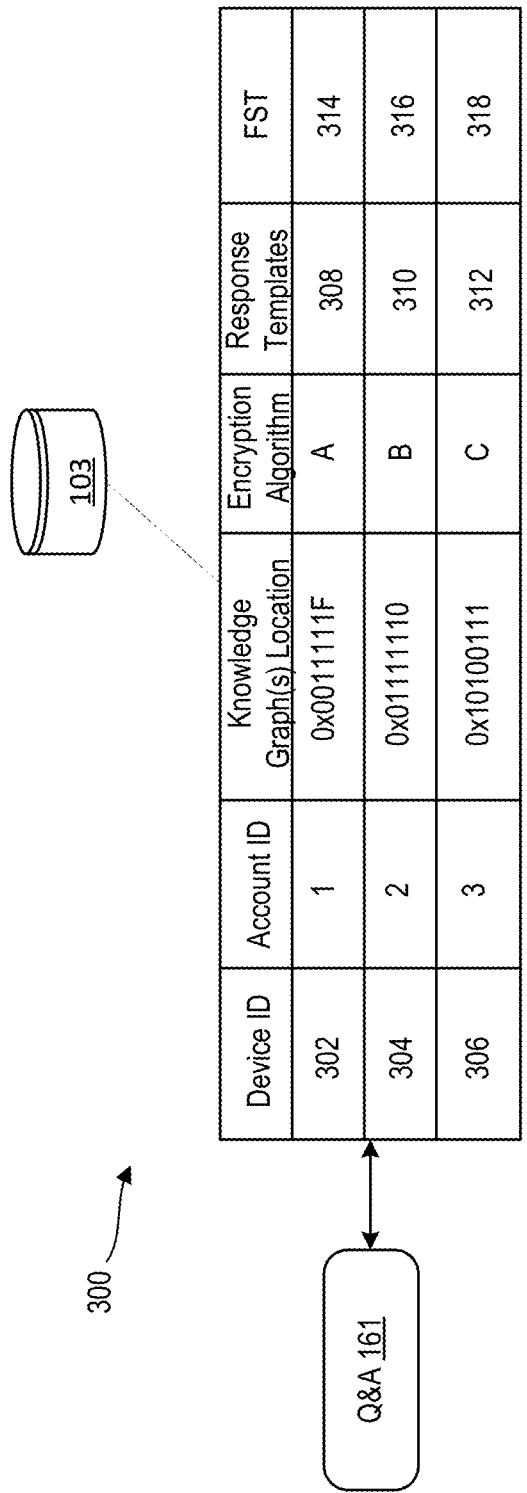
FIG. 3 depicts a data structure that may be used to associate response templates with account identifiers and other data, in accordance with various aspects of the present disclosure.

FIG. 3 depicts a data structure 300 that may be configured to associate response templates with account identifiers and other data, in accordance with various aspects of the present disclosure.

As previously described, a particular knowledge graph may be associated with a group of users having common access privileges (e.g., a tenant such as an organization). In various other examples, a knowledge graph may be accessible by one or more users that are in a particular situation. For example, users that are in a particular location (e.g., an amusement park, a mall, etc.) may access a knowledge graph specific to the applicable location. Since knowledge graphs may represent a tenant's organizational knowledge and such knowledge may include sensitive and/or otherwise private data, the knowledge graphs and/or response templates associated with the tenant may be encrypted and stored as encrypted data in some examples. Additionally, the knowledge graph and/or response templates associated with a tenant may be sandboxed in memory. Accordingly, question and answer component 161 may store a data structure 300 that associates the memory locations of knowledge graphs and/or response templates with account IDs, device IDs, encryption algorithms, FSTs and so forth.

For example, question and answer component 161 may receive text data representing a user question. The question and answer component 161 may receive metadata in association with the text data indicating a device ID. The metadata may be used to identify an appropriate knowledge graph and/or appropriate response templates that may be used to answer the user question. For example, the question and answer component 161 may determine an account ID associated with the device ID. For example, the device ID may associate the device with an organization's account and/or with a particular access privilege level for the organization's account. Additionally, the question and answer component 161 may determine, using the device ID and/or the account ID a location in memory where data for the organization is stored.

For example, as depicted in FIG. 3, the question and answer component 161 may determine a location in memory where the knowledge graph(s) associated with the device ID and/or the account ID are stored. Although, not shown, the question and answer component 161 may also determine a network address of a server on which the knowledge graph's are stored, a port number, a database partition ID, a shard ID, etc., in order to locate the knowledge graph's. Similarly, the question and answer component 161 may determine where response templates associated with the device ID and/or account ID are stored using data stored in data structure 300. For example, device ID 302 may be associated with account ID 1, a knowledge graph beginning at the memory address 0x0011111F, encryption algorithm A, response templates 308, and one or more FSTs 314. Similarly, device ID 304 may be associated with account ID 2, a knowledge graph beginning at the memory address 0x01111110, encryption algorithm B, response templates 310, and one or more FSTs 316, and device ID 306 may be associated with account ID 3, a knowledge graph beginning at the memory address 0x10100111, encryption algorithm C, response templates 312, and one or more FSTs 318, etc.

The FSTs may be configured to parse the incoming text data, to generate understanding representations of the incoming text data and/or to determine whether or not one or more templates associated with the tenant (e.g., a particular account ID) are applicable to the input natural language input data.

In various examples, the encryption algorithm may be particular to a particular tenant. Accordingly, knowledge graphs and/or response templates associated with the template may be encrypted using the particular encryption algorithm to enhance security of the tenant's data. The data structure 300 may store the identity of the encryption algorithm in order to properly encrypt and decrypt the data (such as the knowledge graph and/or response template). The data structure 300 may be stored in the non-transitory computer-readable memory 103 discussed above in reference to FIG. 1.

Figure 4:
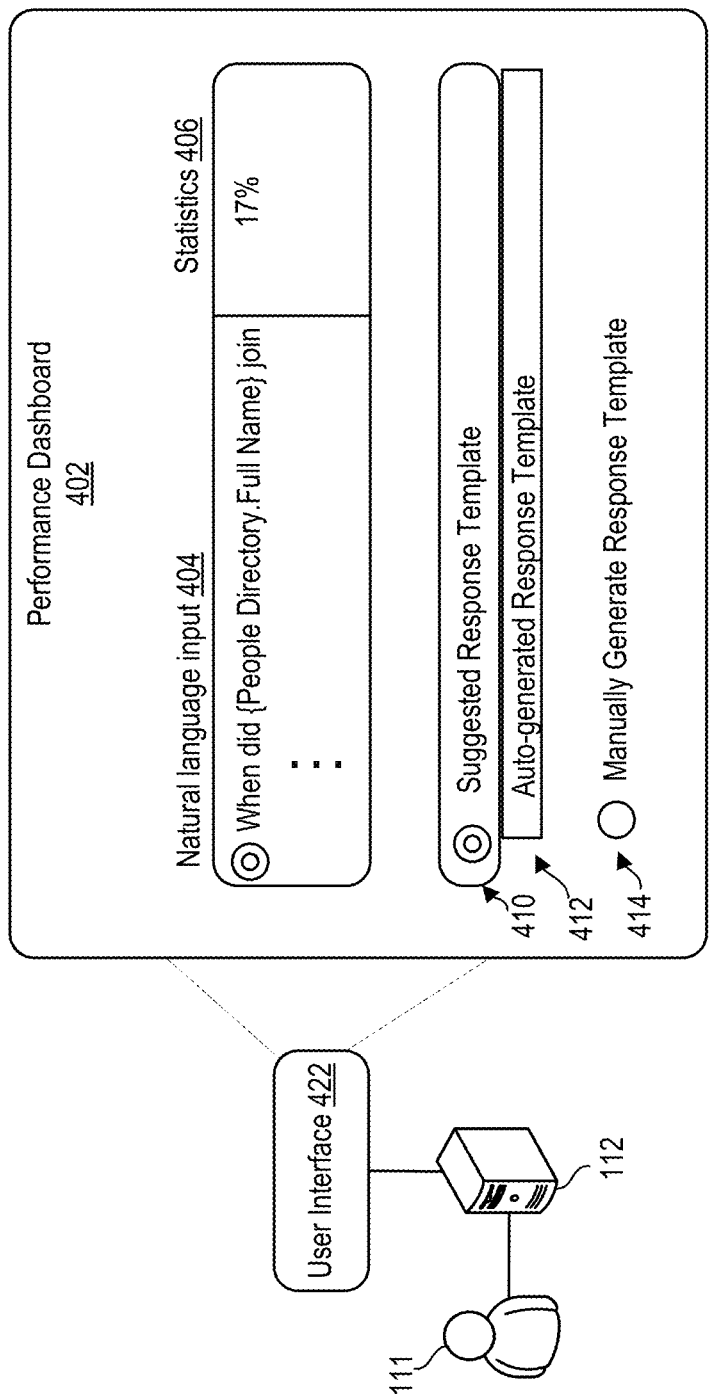
FIG. 4 depicts a performance dashboard that may be used to track performance of a natural language processing system, in accordance with various aspects of the present disclosure.

FIG. 4 depicts a performance dashboard 402 that may be configured to track performance of a natural language processing system, in accordance with various aspects of the present disclosure. In various examples, the performance dashboard 402 may be displayed as part of user interface 422 (e.g., a graphical user interface (GUI)).

The performance dashboard 402 may show statistics (e.g., performance measurements such as confidence scores, user satisfaction metrics, etc.) related to particular natural language input data (e.g., user utterances). For example, a statistic my describe a likelihood that an input question is answerable (and/or is accurately answerable) using a particular knowledge graph. Generally, the performance dashboard 402 may be an interface that shows how the question and answer component 161 is performing on various questions related to the tenant's knowledge graph and/or response templates. The performance dashboard 402 may be tenant specific and may be encrypted when stored in memory to prevent unauthorized access.

In the example performance dashboard 402, a suggested response template field 410 may be selected to display a suggested response template for the natural language input data selected in natural language input field 404. For example, since the utterance "When did {People_Directory.Full_Name} join" is not performing well (e.g., 17% satisfaction score in statistics field 406), the performance dashboard 402 may suggest an automatically-generated response template that may be configured to respond to the utterance in the future, if enabled. In the example depicted in FIG. 4, the suggested response template is named "auto-generated response template" 412. In addition, performance dashboard 402 may display an option to manually generate a response template using selectable icon 414. If selectable icon 414 is selected, the user 111 may be transitioned to interface 122 (or similar) depicted in FIG. 2.

Figure 5:
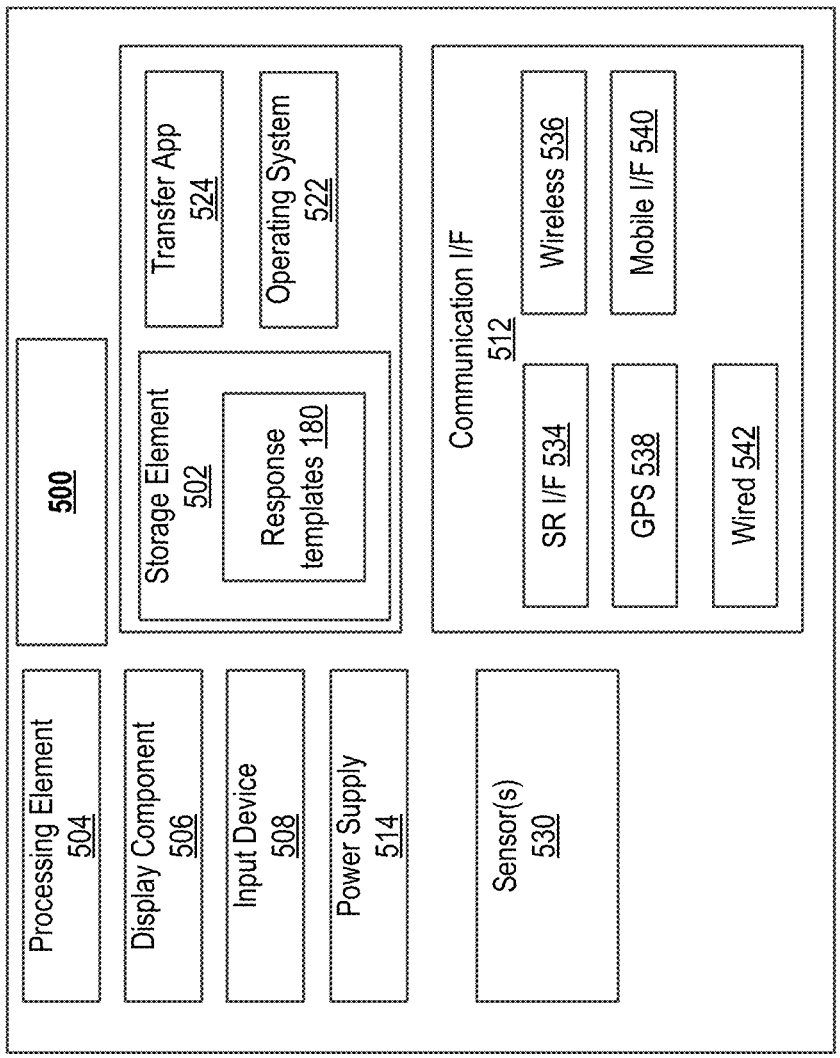
FIG. 5 is a block diagram showing an example architecture of a computing device that may be used to generate natural language responses to questions, in accordance with various embodiments described herein.

FIG. 5 is a block diagram showing an example architecture 500 of a computing device that may be configured to access and/or implement natural language processing system 120, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models used in natural language processing (and/or parameters thereof), various NLU models, knowledge graphs, response templates, FSTs, etc. In addition, response templates 180 may be stored in storage element 502.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the natural language processing system 120, as described herein, are exemplary, and may be located as a stand-alone device or may be included, in whole or in part, as a component of a larger device or system.

Figure 6:
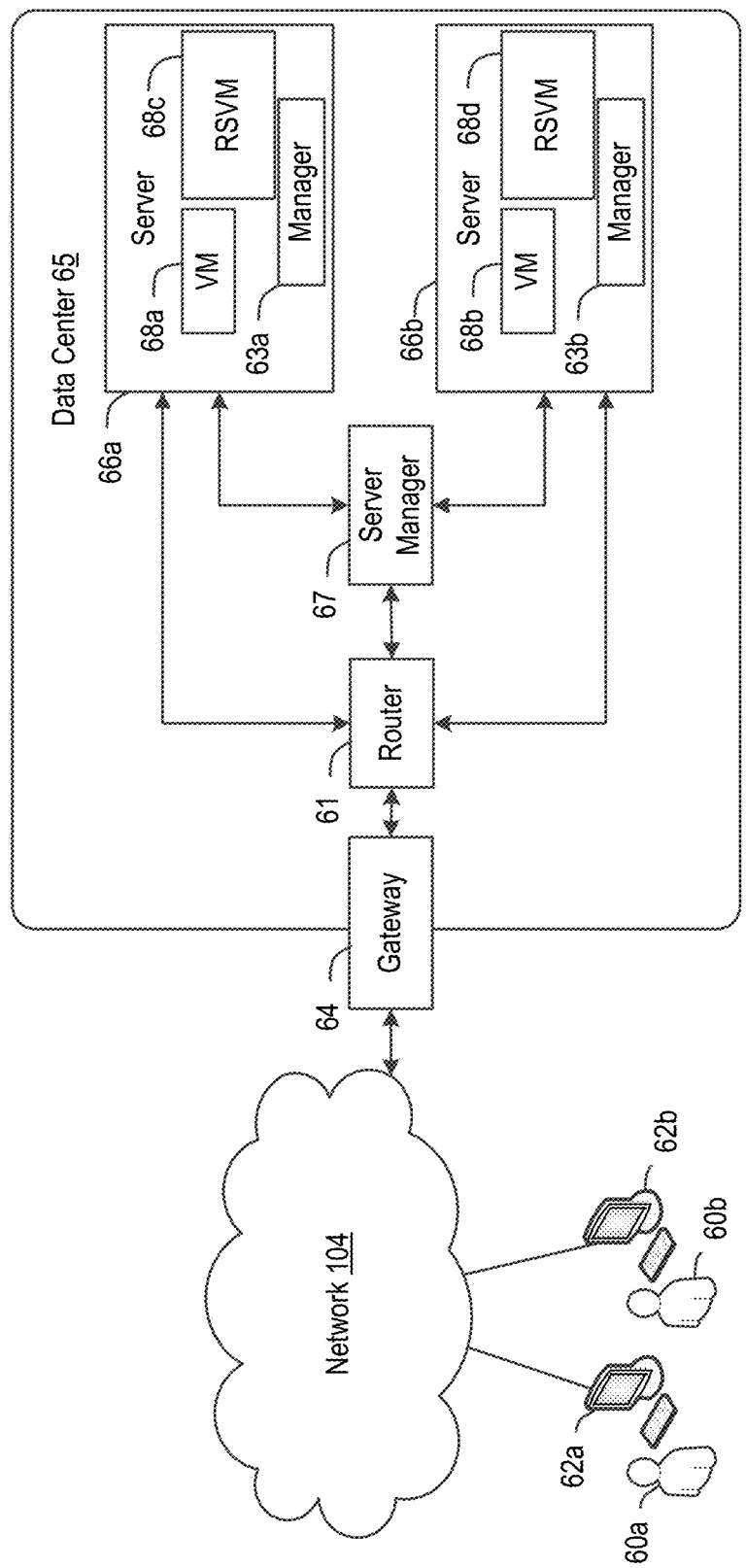
FIG. 6 is a diagram illustrating an example system for sending and providing data that may be used in accordance with the present disclosure.

An example system for sending and providing data and processing data of natural language processing systems will now be described in detail. In particular, FIG. 6 illustrates an example computing environment in which the embodiments described herein may be implemented. For example, the computing environment of FIG. 6 may be configured to provide natural language processing as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various natural language processing techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
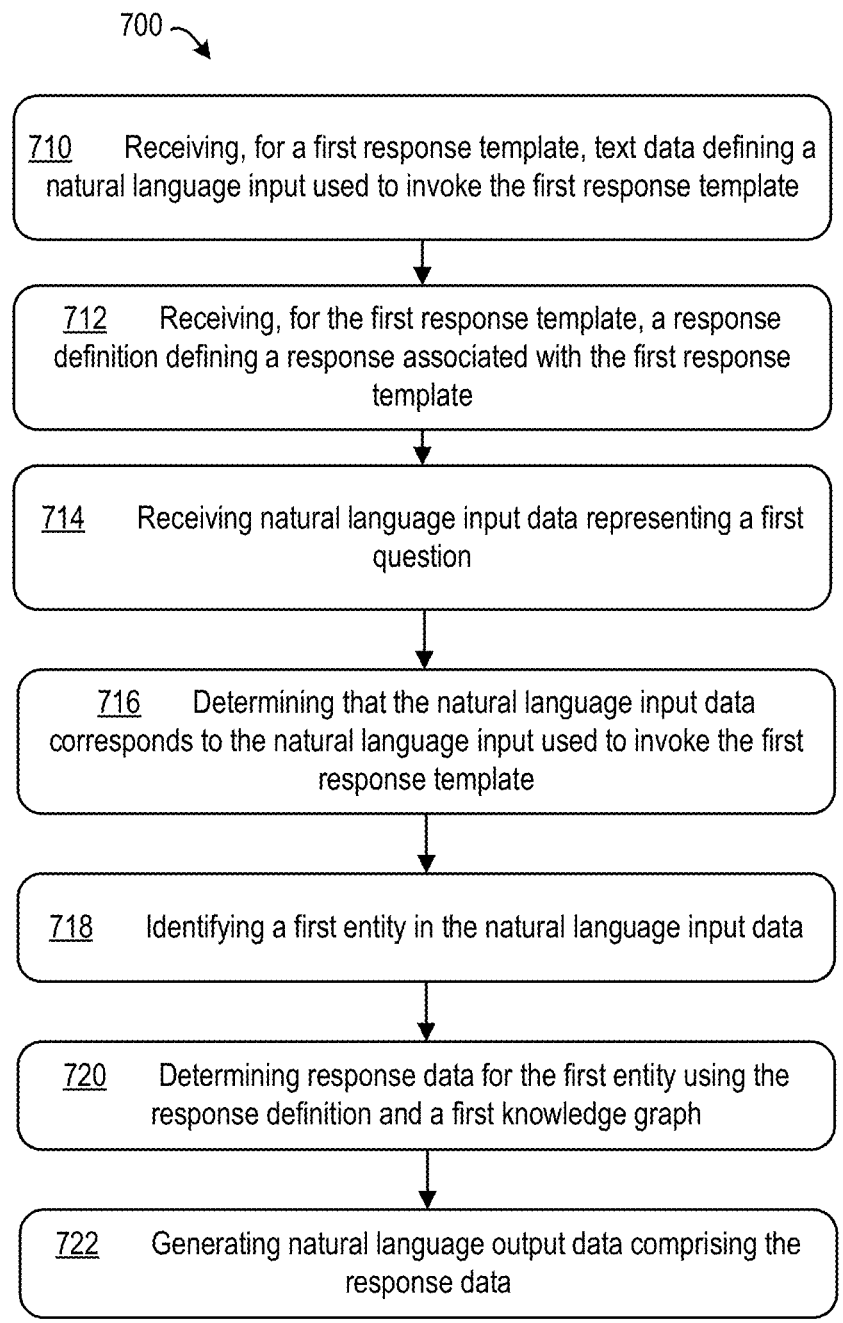
FIG. 7 depicts a flow chart showing an example process for generating and using a response template for a tenant, in accordance with various aspects of the present disclosure.

FIG. 7 depicts a flow chart showing an example process 700 for generating and using a response template for a tenant, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which text data defining a natural language input configured to invoke a first response template may be received. For example, the text data may define the types of utterances and/or other natural language inputs that may be configured to invoke the response template being generated. As previously described, in various examples, the text data may include slot data identifying a particular entity and/or attribute of a knowledge graph and/or other data structure.

Processing may continue from action 710 to action 712, at which a response definition may be received that defines a response associated with the first response template. A response definition may include the response type (e.g., response type 208 of FIG. 2) as well as data defining the response. For example, a particular response definition may include that a response type should be an attribute and in addition may specify the attribute that should be returned (from the pertinent knowledge graph and/or other data structure). In another example, a particular response definition may include that a response type should be a skill hand-off and in addition may specify the skill and/or skills to which the natural language input (and/or a specified attribute determined for the natural language input) should be sent.

Processing may continue from action 712 to action 714, at which natural language input data representing a question may be received. The natural language input data may be text data generated using ASR component 150 and/or may be text data (and/or other types of input, as described above) received at a client-side input device.

Processing may continue from action 714 to action 716, at which a determination may be made that the natural language input data corresponds to the natural language input configured to invoke the response template. At action 716, a determination may be made using a heuristic approach, an FST, a machine learning approach or similar to determine that the input question (e.g., the natural language input data) corresponds to the natural language input that invokes the response template. In various examples, this determination may be made by determining a structured representation of the input text (e.g., a triple or other structured data representation) and comparing such a representation to a structured representation of the text that invokes the template (e.g., as defined using natural language input field 206).

Processing may continue from action 716 to action 718, at which a first entity in the natural language input data may be identified. For example, slot data may be included in the natural language input that invokes the response template. The slot data may reference a first entity that is stored in the knowledge graph and/or another data structure. The slot data may identify the knowledge graph or other data structure that includes the entity and may specify a name of the entity. For example, the slot data may be {Table 3.Name}. Accordingly, to determine the entity, question and answer component 161 may consult Table 3 and may search a Name field for a name of an entity that was included in the natural language input data. For example, the user may have asked "Where does Trudy Parsnip sit?" In this example, the question and answer component 161 may search the Name field of Table 3 for the entity Trudy Parsnip.

Processing may continue from action 718 to action 720, at which response data may be determined for the first entity using the response definition and a first knowledge graph. At action 720, the response definition may provide an attribute to be returned and/or a natural language processing skill to which data should be sent. In the above example, the attribute may be Office Number from the knowledge graph and/or from Table 3. Accordingly, question and answer component 161 may find the value for the Office Number attribute for the first entity (e.g., Trudy Parsnip). Accordingly, the response data may be the office number.

Processing may continue from action 720 to action 722, at which natural language output data may be generated comprising the response data. For example, the question and answer component 161 and/or some other natural language processing component may generate natural language output data such as "Trudy Parsnip sits in office number 313."

Figure 8:
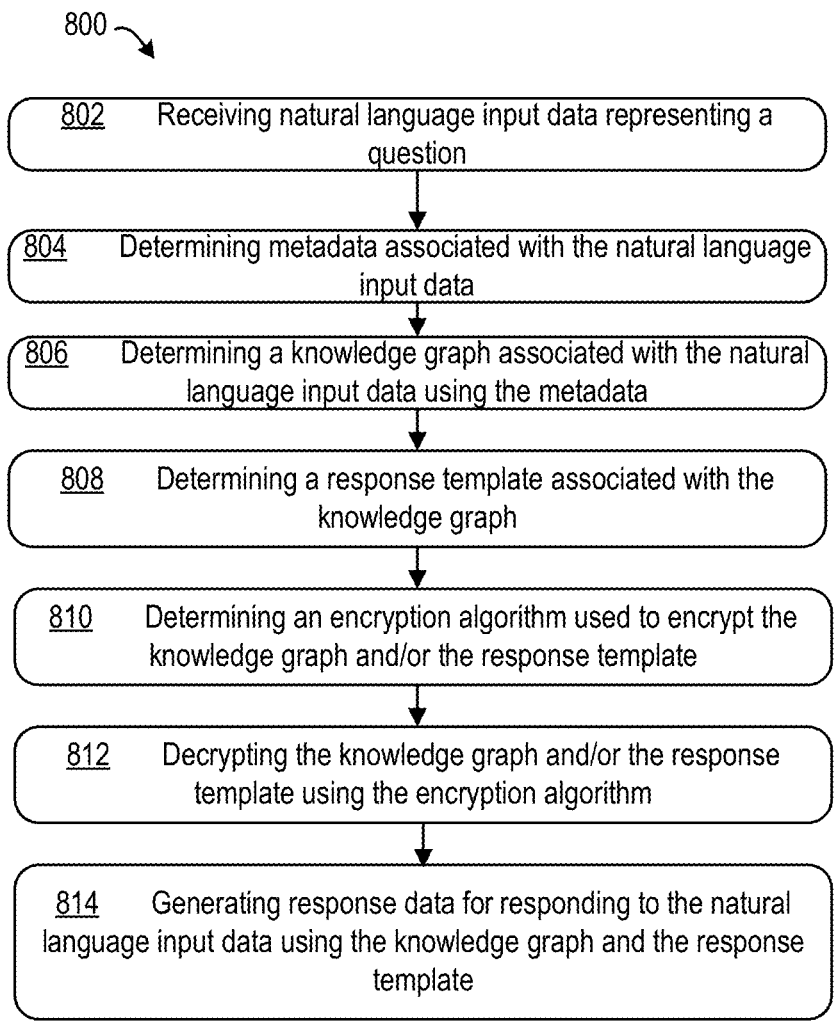
FIG. 8 depicts a flowchart showing an example process for determining and using a tenant-specific response template and knowledge graph in a natural language processing system, in accordance with various aspects of the present disclosure.

FIG. 8 depicts a flowchart showing an example process for determining and using a tenant-specific response template and knowledge graph in a natural language processing system, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 of FIG. 8 may begin at action 802, at which natural language input data representing a question may be received. The natural language input data may be text data representing the question.

Processing may continue from action 802 to action 804, at which metadata associated with the natural language input data may be determined. In various examples, the metadata may indicate an account ID associated with the natural language input data, a device ID at which the question was received, access privileges of the account and/or device, a knowledge graph associated with the account, etc.

Processing may continue from action 804 to action 806, at which a knowledge graph associated with the natural language input data may be determined using the metadata. For example, data structure 300 may be configured to determine the knowledge graph (e.g., an identifier associated with the knowledge graph, the port number on which the knowledge graph is accessible, the location in memory where the knowledge graph is stored, etc.) associated with the account ID indicated in the metadata.

Processing may continue from action 806 to action 808, at which a response template associated with the knowledge graph may be determined. In various examples, one or more response templates associated with the knowledge graph may be determined using data structure 300.

Processing may continue from action 808 to action 810, at which an encryption algorithm configured to encrypt the knowledge graph and/or the response template may be determined. In various examples, the encryption algorithm may be stored in a data structure (e.g., data structure 300) in association with the knowledge graph and/or response templates.

Processing may continue from action 810 to action 812, at which the knowledge graph and/or the response template may be decrypted using the encryption algorithm (e.g., as configured for decryption) so that the knowledge graph and/or response template may be used to process the natural language input data as described herein. Processing may continue from action 812 to action 814, at which response data may be generated for responding to the natural language input data using the knowledge graph and the response template, as described herein.

FIG. 9 is a block diagram illustrating an example speech processing system 900, according to various embodiments of the present disclosure. In various examples, the speech processing system may use response templates 180 to generate response data that may be output in response to user questions (e.g., via TTS component 936).

The various components illustrated FIG. 9 may be located on the same or different physical devices. Communication between various components illustrated in FIG. 9 may occur directly or across a network. A speech processing-enabled device may capture audio using an audio capture component, such as one or more microphone(s). The speech processing enabled device may send audio data 102 (e.g., corresponding to an utterance) to an orchestrator 930 of the speech processing system 900. The speech processing enabled device may also send metadata (e.g., including device identifiers, device type data, contextual data, IP address data, room location data, etc.) to the orchestrator 930. The components depicted in FIG. 9, including components of a speech processing system may be generally referred to as spoken language processing components, a speech processing system 900 a spoken language processing system, speech processing components, and/or a speech processing routing system. Additionally, in various examples, the components depicted in FIG. 9 may process written input (e.g., text data) in addition to spoken input.

Upon receipt by the speech processing system 900, the audio data 102 may be sent to an orchestrator 930. The orchestrator 930 may include memory and logic that enables the orchestrator 930 to initiate a dialog session and to transmit various pieces and forms of data to various components of the system, as described in further detail below.

The orchestrator 930 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 904 generated thereby to orchestrator 930 that may, in turn, send the text data 904 to NLU component 160 and/or question and answer component 161. As previously described, the text data 904 may include one or more ASR hypotheses. The text data 904 may include a top scoring hypothesis of the speech represented in the audio data 102 or may include an N-best list including a group of hypotheses of the speech represented in the audio data 102, and potentially respective ASR processing confidence scores. As previously described, in some other examples, the ASR component 150 (and/or other components of the speech processing system 900) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 900), a number of tokens output by ASR, etc.

The NLU component 160 attempts to make a semantic interpretation of the phrases or statements represented in the text data input therein. That is, the NLU component 160 determines one or more meanings associated with the phrases or statements represented in the text data 904 based on individual words represented in the text data 904. The NLU component 160 interprets a text string to derive an intent of the user (e.g., an action that the user desires be performed) as well as pertinent pieces of information in the text data that allow a device (e.g., the speech processing enabled device, the speech processing system 900, a computing device(s) implementing a skill, etc.) to complete the intent. For example, if the text data 904 corresponds to "Set temperature to 74 degrees," the NLU component 160 may determine the user intended to invoke a climate intent with a target temperature value slot of 74 degrees Fahrenheit. A federated NLU approach may be employed in which a number of different NLU strategies are used to determine various NLU output data. The NLU output data may be ranked and the best output (and/or a list of the best NLU outputs) may be sent to downstream components. As previously described, in addition to the NLU intent and slot data, the NLU component 160 may generate other metadata associated with the utterance (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 160 (depicted in FIG. 9 as "NLU 160") is referred to as NLU output data 906.

In some examples, text data 904 may be sent to a question and answer (Q&A) component 161 that may use one or more knowledge bases and/or knowledge graphs to answer a question represented in the text data 904. As previously described, the question and answer component 161 may use bottom-up NLU strategies and/or top-down NLU strategies (e.g., using response templates 180) to determine a semantic interpretation of the natural language input data and to generate a response. In at least some examples, the question and answer component 161 may determine an answer to the question in parallel with processing of the text data 904 by NLU component 160. In various examples, the question and answer component 161 may be configured to output structured data (e.g., a meaning representation) representing an answer to a question present in the text data 904. For example, the answer to a question may comprise triple data including a subject, object, and predicate, as described herein. However, in some examples, the meaning representation may be other structured data, apart from triple data, as known to those skilled in the art. In various examples, the decider engine 932 and/or the ranking component 920 may determine whether the output from the question and answer component 161 or the NLU output data 906 is more likely to address a particular user input.

NLU component 160 may send the text data 904 and/or some of NLU output data 906 (such as intents, recognized entity names, slot values, etc.) to a shortlister 910. The shortlister 910 may comprise one or more machine learning models that may be effective to predict a subset of skills that are most likely to be able to correctly process the input data, based on the input of the text data 904 and/or the NLU output data 906. In addition, the shortlister 910 may call the ranking and arbitration component 940 to request features pre-computed by the ranking and arbitration component 940 according to features used as inputs by the machine learning models of shortlister 910. As previously described, the shortlister 910 may define source data used to compute the features and/or may specify functions used to generate the features from the source data (e.g., formulae and/or functions) prior to runtime processing of input data. The ranking and arbitration component 940 may precompute the features according to the specified feature definitions supplied by shortlister 910 and by the other components of speech processing system 900 and may store the precomputed features in memory. Ranking and arbitration component 940 may generate indexes that may be used to retrieve the precomputed features during runtime (e.g., through an API). Accordingly, during runtime processing, shortlister 910 may retrieve the precomputed features from ranking and arbitration component 940 and may use the precomputed features (among other inputs) to predict a subset of skills that are most likely to be appropriate to process the current input data. In some examples, in addition to predicting a subset of skills, shortlister 910 may predict whether or not question and answer component 161 is likely to generate an appropriate response to the current input data. Accordingly, shortlister 910 may send the top K skills 908 to NLU component 160. NLU component 160 may thereafter perform skill-specific NLU processing (and/or question-and-answer processing by question and answer component 161) for the skills in the top K skills 908 to determine skill-specific intents, slots, and/or named entities. NLU output data 906 may include such skill-specific data (e.g., skill-specific N-best hypotheses).

Ranking and arbitration component 940 may communicate with various systems in order to obtain source data used to precompute features. For example, ranking and arbitration component 940 may communicate with feedback storage 943 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 900. As previously discussed, in various examples user feedback data may be predicted for input data prior to processing the input data using a skill 190. In various examples, user feedback data may be used to pre-compute various features used by machine learning models of speech processing system 900. Accordingly, in some examples, the skills selected for processing particular input data may be determined based at least in part on skills that a user (or a group of similar users) has responded positively to in the past.

Additionally, ranking and arbitration component 940 may communicate with endpoint context system 954, which may provide context data at the conclusion of a user interaction with the speech processing system 900. In another example, ranking and arbitration component 940 may communicate with skill data 956 to determine information from the skill regarding past interactions with the skill and/or data acquired by the skill. Additionally, ranking and arbitration component 940 may communicate with other data sources 955, as new services are added and/or as new data types that may be useful for routing prediction are made available. In addition to ranking and arbitration component 940 using context data 942 to precompute features used by various machine learning models of the routing architecture of the speech processing system 900, a context system 941 may receive the context data 942. The context system 941 may provide the context data directly to both ranking and arbitration component 940 as well as to various components of the routing architecture of speech processing system 900. For example, the context system 941 may send context data 942 to shortlister 910 and/or ranking component 920 in order to determine a shortlist of skills 190 for particular input data and/or in order to rank the shortlisted skills.

NLU output data 906 (which may, in some examples, include question and answer output data) and top K skills 908 may be sent by NLU component 160 to orchestrator 930. Orchestrator 930 may send the top K skills 908 and the NLU output data 906 to routing service 912. Routing service 912 may send the top K skills 908 and NLU output data 906 to skill proposal component 914. Skills 190 may subscribe to particular intents using skill proposal component 914. Accordingly, skill proposal component 914 may receive the NLU output data 906 and may determine whether any of the included intents correspond to one or more of skills 190. If so, skill proposal component 914 may generate candidate data comprising <Intent, Skill> candidate pairs 915. The candidate pairs 915 may be sent to routing service 912 and may be sent by routing service 912 to skill query service 916. Skill query service 916 comprises an API through which skills 190 may "opt out" of particular requests. For example, a skill 190 may comprise a video playback skill. Accordingly, the skill 190 may register with skill query service 916 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request represented by the current input data. Skill query service 916 may send a signal 917 indicating what skills can fulfill a particular request (and/or what skills are unable to fulfill the request). The signal 917 may be sent to routing service 912. Routing service 912 may send the signal 917 along with the candidate pairs 915 to a ranking component 920. As depicted in FIG. 2, skills 190 may send context data 942 to skill query service 916 to indicate situations in which a skill may opt out of processing a particular request (e.g., if the device sending the input data does not include a display screen, etc.). In various examples, the context data 942 sent by skills 190 to skill query service 916 may be skill and/or request specific context data. Additionally, skill query service 916 may send intent requests 947 to skills 190.

Ranking component 920 may include one or more statistical machine learning models effective to rank the candidates included in candidate pairs 915. In order to rank the candidate pairs 915, ranking component 920 may generate confidence scores for each corresponding candidate pairs 915. A confidence score may indicate that the corresponding skill 190 and/or intent of the candidate pair is appropriate to process the request. Ranking component 920 may compute features using the candidate pairs 915 and signal 917 in order to predict the ranking of the skills 190 included in the candidate pairs 915. The features computing during processing of the input data (sometimes referred to as "runtime features") may comprise a feature representation of the list of candidate pairs 915 and/or a representation of the signal 917. Additionally, ranking component 920 may query ranking and arbitration component 940 for precomputed features that have been defined for use by ranking component 920. As previously described, the precomputed features may be determined based on contextual data, user feedback data, past usage data, skill data, previous rankings of ranking component 920, etc. Additionally, ranking component 920 may compute runtime features using context data 942, user feedback data from feedback storage 943, and/or other data sources. In various examples, the loss function for the machine learning models of ranking component 920 may optimize based on user satisfaction scores computed using user feedback data from feedback storage 943.

Ranking component 920 may generate a ranked list 918 of the candidate skills indicated in candidate pairs 915. In at least some examples, the ranking component 920 may use a deep neural network as a machine learning model for determining the ranked list 918. In some examples, ranking component 920 (and/or some other speech processing system 900 component, such as decider engine 932) may determine plan data that may override the ranked list 918 such that a lower ranked skill among the candidate pairs 915 may be selected for processing the input data.

In another example, the decider engine 932 may store policies that may control whether or not explicit user feedback is solicited (e.g., via TTS) after the completion of an action (e.g., by the top-ranked skill determined by the ranker component). Explicit feedback may be solicited through the dialog speechlet 952 prior to routing input data to a skill for processing. In another example, decider engine 932 may control feedback component 997 to request explicit feedback from a user post-skill processing (e.g., via TTS). In various examples, feedback component 997 may ask the user whether or not the user was satisfied with the action taken by the speech processing system 900. In yet another example, an exploration policy defining a dynamic routing adjustment may send input data that matches predicate data defined using the dynamic routing adjustment component to a newly-implemented skill 190. The decider engine 932 may determine that the top ranked result from the ranking component 920 should be ignored due to the dynamic routing adjustment being performed by the dynamic routing adjustment component. Additionally, in some examples, a policy of the decider engine 932 may be to solicit explicit feedback from the user whenever a new skill is routed to due to a dynamic routing adjustment. Accordingly, at the completion of the action, the decider engine 932 may control TTS to inquire as to whether the user was satisfied with the interaction with the new skill and/or whether the performed action was the action intended by the user.

Decider engine 932 may output plan data that comprises a routing plan 934 for processing the input data. The routing plan 934 may define a target skill 190 (and/or may identify that question and answer component 161) to process the input data. As described above, the target skill 190 may be selected as the top-ranked hypothesis determined by the ranking component 920. In some other examples, the decider engine 932 may select a target skill 190 based on a policy, as described above. In some examples, the ranking component 920 may determine that two different skills are equally applicable for processing the input data. In such examples, the decider engine 932 may determine that disambiguation should occur. Accordingly, the routing plan 934 may include sending the input data to a dialog speechlet 952 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 932 may determine that the top two hypotheses of ranking component 920 are equally likely (or approximately equally likely) and may determine that a question should be asked to disambiguate between the two possible actions. Accordingly, the routing plan 934 may route the input data to the dialog speechlet 952, and the dialog speechlet 952 may inquire whether the user intended to play the movie or the soundtrack.

In another example, the decider engine 932 may determine that the user was not satisfied with the top hypothesis of the ranking component 920 (e.g., due to explicit or implicit feedback received from the user in response to taking an action associated with the top ranking component 920 hypothesis). Accordingly, the decider engine 932 may determine that the routing plan 934 should be to determine the second highest ranked hypothesis of the ranking component 920.

If a skill 190 outputs natural language text in response to processing, the orchestrator may send the text to TTS component 936 for output as audio representing the speech.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving text data defining a natural language input configured to invoke a first response template;
   receiving a response definition defining a response associated with the first response template;
   storing the first response template including the response definition in at least one memory;
   receiving natural language input data representing a first question;
   receiving metadata identifying a first knowledge graph associated with the natural language input data;
   determining that the natural language input data corresponds to the first response template in the at least one memory based at least in part on a correspondence between the natural language input data and the natural language input configured to invoke the first response template;
   identifying a first entity in the natural language input data;
   determining response data for the first entity using the response definition and the first knowledge graph; and
   generating natural language output data comprising the response data.

2. The method of claim 1, further comprising:
   determining an account associated with the natural language input data using the metadata;
   determining that the first knowledge graph is associated with the account; and
   determining, using account data associated with the account, a location of the first knowledge graph in the at least one memory.

3. The method of claim 1, further comprising:
   determining a finite state transducer associated with the metadata; and
   determining that the natural language input data corresponds to the natural language input using the finite state transducer.

4. The method of claim 1, further comprising:
   encrypting the first knowledge graph using a first encryption algorithm to generate encrypted data;
   determining an account associated with the natural language input data;
   determining that the first encryption algorithm is associated with the account; and
   decrypting the first knowledge graph using the first encryption algorithm.

5. The method of claim 1, further comprising:
   determining, for the first knowledge graph associated with a first account, a first finite state transducer;
   determining, for a second knowledge graph associated with a second account, a second finite state transducer;
   receiving second natural language input data associated with the second account;
   using the second finite state transducer to determine a second response template corresponding to the second natural language input data; and
   generating second natural language output data based at least in part on the second response template.

6. The method of claim 1, wherein the response definition comprises an instruction to send the natural language input to a first speech processing skill, the method further comprising:
   sending the natural language input data to the first speech processing skill; and
   generating, by the first speech processing skill, the natural language output data.

7. The method of claim 1, further comprising:
   determining, for the first entity, a first attribute and a second attribute associated with the first entity;
   determining, from the first response template, that the response definition indicates that the first attribute is the response associated with the first response template; and
   determining, based at least in part on the first response template, a value for the first attribute associated with the first entity, wherein the response data comprises the value for the first attribute.

8. The method of claim 1, further comprising:
   assigning the first response template to a first speech processing skill;
   receiving, by the first speech processing skill, the natural language input data;
   determining, by the first speech processing skill, that the first response template is appropriate to process the natural language input data; and
   generating, by the first speech processing skill, the natural language output data comprising the response data.

9. The method of claim 1, further comprising:
   assigning the first response template to a first speech processing skill, wherein the first speech processing skill is effective to use the first response template to generate first skill output using first skill data specific to the first speech processing skill; and
   assigning the first response template to a second speech processing skill, wherein the second speech processing skill is effective to use the first response template to generate second skill output using second skill data specific to the second speech processing skill.

10. A system comprising:
at least one processor; and
at least one non-transitory computer-readable memory storing instructions that, when executed by the at least one processor, are effective to program the at least one processor to:
  receive text data defining a natural language input configured to invoke a first response template;
  receive a response definition defining a response associated with the first response template;
  store the first response template including the response definition in the at least one non-transitory computer-readable memory;
  receive natural language input data representing a first question;
  receive metadata used identifying a first knowledge graph associated with the natural language input data;
  determine that the natural language input data corresponds to the first response template in the at least one non-transitory computer-readable memory based at least in part on a correspondence between the natural language input data and the natural language input configured to invoke the first response template;
  identify a first entity in the natural language input data;
  determine response data for the first entity using the response definition and the first knowledge graph; and
  generate natural language output data comprising the response data.

11. The system of claim 10, the at least one non-transitory computer-readable memory storing further instructions that, when executed by the at least one processor, are further effective to program the at least one processor to:
  determine an account associated with the natural language input data using the metadata;
  determine that the first knowledge graph is associated with the account; and
  determine, using account data associated with the account, a location of the first knowledge graph in memory.

12. The system of claim 10, the at least one non-transitory computer-readable memory storing further instructions that, when executed by the at least one processor, are further effective to program the at least one processor to:
  determine a finite state transducer associated with the metadata; and
  determine that the natural language input data corresponds to the natural language input using the finite state transducer.

13. The system of claim 10, the at least one non-transitory computer-readable memory storing further instructions that, when executed by the at least one processor, are further effective to program the at least one processor to:
  encrypt the first knowledge graph using a first encryption algorithm to generate encrypted data;
  determine an account associated with the natural language input data;
  determine that the first encryption algorithm is associated with the account; and
  decrypt the first knowledge graph using the first encryption algorithm.

14. The system of claim 10, the at least one non-transitory computer-readable memory storing further instructions that, when executed by the at least one processor, are further effective to program the at least one processor to:
  determine, for the first knowledge graph associated with a first account, a first finite state transducer;
  determine, for a second knowledge graph associated with a second account, a second finite state transducer;
  receive second natural language input data associated with the second account;
  use the second finite state transducer to determine a second response template corresponding to the second natural language input data; and
  generate second natural language output data based at least in part on the second response template.

15. The system of claim 10, wherein the response definition comprises a first instruction to send the natural language input to a first speech processing skill, and wherein the at least one non-transitory computer-readable memory stores further instructions that, when executed by the at least one processor, are further effective to program the at least one processor to:
  send the natural language input data to the first speech processing skill; and
  generate, by the first speech processing skill, the natural language output data.

16. The system of claim 10, the at least one non-transitory computer-readable memory storing further instructions that, when executed by the at least one processor, are further effective to program the at least one processor to:
  determine, for the first entity, a first attribute and a second attribute associated with the first entity;
  determine, from the first response template, that the response definition indicates that the first attribute is the response associated with the first response template; and
  determine, based at least in part on the first response template, a value for the first attribute associated with the first entity, wherein the response data comprises the value for the first attribute.

17. The system of claim 10, the at least one non-transitory computer-readable memory storing further instructions that, when executed by the at least one processor, are further effective to program the at least one processor to:
  assign the first response template to a first speech processing skill;
  receive, by the first speech processing skill, the natural language input data;
  determine, by the first speech processing skill, that the first response template is appropriate to process the natural language input data; and
  generate, by the first speech processing skill, the natural language output data comprising the response data.

18. A method comprising:
  receiving text data defining a natural language input configured to invoke a first response template;
  receiving a response definition defining a response associated with the first response template;
  storing the first response template including the response definition in at least one memory;
  receiving natural language input data representing a first question;
  determining an account associated with the natural language input data;
  determining a first knowledge graph associated with the account and the natural language input data;

determining that the natural language input data corresponds to the first response template in the at least one memory based at least in part on a correspondence between the natural language input data and the natural language input configured to invoke the first response template;

identifying a first entity in the natural language input data;

determining response data for the first entity using the response definition and the first knowledge graph; and generating natural language output data comprising the response data.

19. The method of claim 18, further comprising:

determining a first finite state transducer associated with the first knowledge graph; and determining that the natural language input data corresponds to the natural language input using the first finite state transducer.

20. The method of claim 19, further comprising:

determining, for a second knowledge graph associated with a second account, a second finite state transducer;

receiving second natural language input data associated with the second account;

using the second finite state transducer to determine a second response template corresponding to the second natural language input data; and generating second natural language output data based at least in part on the second response template.

* * * * *